(12) United States Patent
Rath et al.

(10) Patent No.: US 7,778,744 B2
(45) Date of Patent: Aug. 17, 2010

(54) AVIONICS FRAMEWORK

(75) Inventors: Manaswini Rath, Bangalore (IN);
Yogesh Patel, Bangalore (IN); Nitin Anand Kale, Bangalore (IN);
Mallikarjun Kande, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 1154 days.

(21) Appl. No.: 11/407,577

(22) Filed: Apr. 20, 2006

(65) Prior Publication Data

US 2007/0246610 A1    Oct. 25, 2007

(51) Int. Cl.
*G01C 23/00* (2006.01)

(52) U.S. Cl. .............. 701/3; 701/1; 701/2; 701/11; 701/23; 701/206; 244/58; 244/120; 244/189; 244/190; 455/433; 455/517

(58) Field of Classification Search ............ 701/3, 701/1, 200
See application file for complete search history.

(56) References Cited

U.S. PATENT DOCUMENTS

| | | | | |
|---|---|---|---|---|
| 5,771,459 | A * | 6/1998 | Demery et al. | 455/517 |
| 6,122,572 | A * | 9/2000 | Yavnai | 701/23 |
| 6,377,875 | B1 * | 4/2002 | Schwaerzler | 701/2 |
| 6,847,865 | B2 * | 1/2005 | Carroll | 701/3 |
| 6,850,252 | B1 * | 2/2005 | Hoffberg | 715/716 |
| 6,856,894 | B1 | 2/2005 | Bodin et al. | |
| 7,509,212 | B2 * | 3/2009 | Bodin et al. | 701/206 |
| 2003/0066932 | A1 * | 4/2003 | Carroll | 244/120 |
| 2003/0136876 | A1 * | 7/2003 | Carroll | 244/58 |
| 2005/0004723 | A1 * | 1/2005 | Duggan et al. | 701/24 |
| 2005/0090945 | A1 | 4/2005 | Bodin et al. | |
| 2005/0090972 | A1 * | 4/2005 | Bodin et al. | 701/206 |
| 2005/0223384 | A1 * | 10/2005 | Klingman | 718/107 |
| 2005/0262286 | A1 * | 11/2005 | Klingman | 711/1 |
| 2006/0058928 | A1 * | 3/2006 | Beard et al. | 701/11 |
| 2006/0101296 | A1 * | 5/2006 | Mares et al. | 713/300 |
| 2006/0167597 | A1 * | 7/2006 | Bodin et al. | 701/3 |

(Continued)

OTHER PUBLICATIONS

Accardo, D., et al., "Low-cost avionics for autonomous navigation software/hardware testing", *2004 IEEE Aerospace Conference, Proceedings*, vol. 4, (2004),3016-3024.

Hsiao, Fei-Bin, et al., "Development of a low cost autonomous surveillance unmanned aerial vehicle system", *Transactions of the Aeronautical and Astronautical Society of the Republic of China*, 35(4), (Dec. 2003),307-316.

(Continued)

*Primary Examiner*—Khoi Tran
*Assistant Examiner*—Jonathan Sample
(74) *Attorney, Agent, or Firm*—Schwegman, Lundberg & Woessner, P.A.

(57) ABSTRACT

A modular avionics system for an Unmanned Aerial Vehicle (UAV) has a control module that executes flight control and vertical and lateral guidance algorithms to generate control commands. A data link module communicates with a remote control station and receives control commands from the remote control station. A data acquisition module communicates with the control module and the data link module. The data acquisition module is configured to receive and process data from one or more onboard sensors and to actuate a plurality of servo motors in response to control commands. A switching module selectively couples the data acquisition module to the control module or to the data link module responsive to an input from the remote control station to respectively switch between a fully autonomous mode of UAV operation and a manual mode of UAV operation. Power may be provided by a power module.

19 Claims, 5 Drawing Sheets

U.S. PATENT DOCUMENTS

2006/0264214 A1* 11/2006 Stanwood et al. ............ 455/433
2006/0271251 A1* 11/2006 Hopkins ....................... 701/23
2007/0018052 A1* 1/2007 Eriksson ...................... 244/190
2007/0244608 A1* 10/2007 Rath et al. .................... 701/3

OTHER PUBLICATIONS

Bertran, Alberti E., et al., "Effects of Packet Format and SBAS Measurement Rate on the Emergency Control of an UAV", *European Space Agency*, (*Special Publication*) *ESA SP, n 509*, (2001), 448-459.

* cited by examiner

AVIONICS FRAMEWORK

BACKGROUND

Recent development in military and civil air surveillance, tracking of object from air, weather modification like applications have emerged an enormous market potential for autonomous Unmanned Aerial Vehicles (UAVs). On board avionics system development is the most challenging part in an UAV system other than the challenge of small aerodynamics structure and software optimization. Autonomous UAV system comprises of an avionics system, aerodynamic structure with engine and peripherals, sensors, actuators and power system. A payload system is integrated to the avionics system, which is application specific. On board avionics system development is the most challenging part in an UAV system other than the challenge of small aerodynamics structure and software optimization.

A sophisticated and complex embedded system in the avionics demand not only system complexity but also adds weight and cost to the UAV system. The major constraints in an UAV avionics system design and development is the cost, weight, size and reliability. An efficient and reliable avionics system demand more cost and compromises in technical capability. The design challenges in such cases are the integration of multiple sensors to the onboard system, switching between modes of operations, communication protocol between onboard and ground station, and distribution of power among the sub system to meet the requirement of long mission endurance.

SUMMARY

A modular avionics system for an unmanned aerial vehicle (UAV) has a control module that executes flight control and vertical and lateral guidance algorithms to generate control commands. A data link module communicates with a remote control station and receives control commands from the remote control station. A data acquisition module communicates with the control module and the data link module. The data acquisition module is configured to receive and process data from one or more onboard sensors and to actuate a plurality of servo motors in response to control commands. A switching module selectively couples the data acquisition module to the control module or to the data link module responsive to an input from the remote control station to respectively switch between a fully autonomous mode of UAV operation and a manual mode of UAV operation. Power may be provided by a power module. The power module incorporates additional features of remote power control and power telemetry.

DETAILED DESCRIPTION

Figure 1:
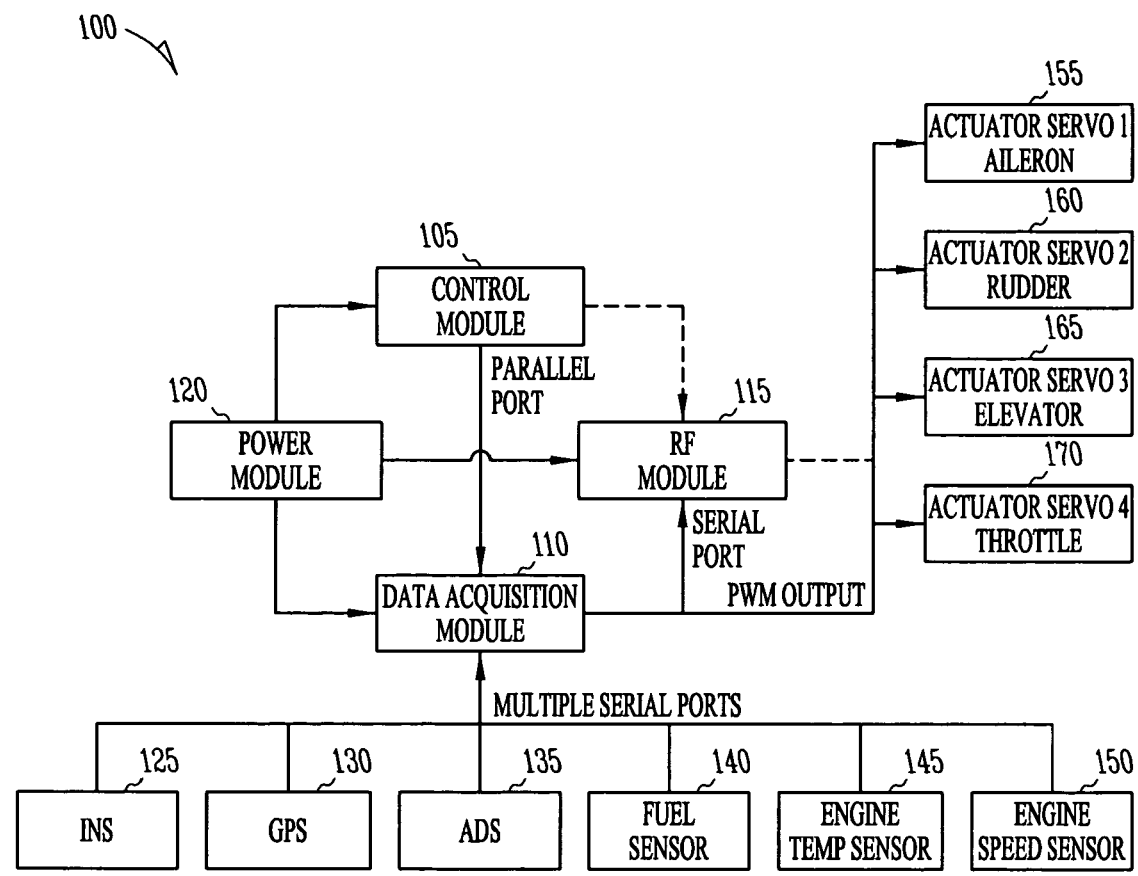
FIG. 1 is a block diagram of a modular avionics framework for an unmanned aerial vehicle (UAV) according to an example embodiment. It comprises of the major sub modules, sensors, actuators and the connectivity between the sub modules.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wireless transmissions. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

A modular avionics framework for an unmanned aerial vehicle uses a combination of commercial off-the-self (COTS) electronics as well as designed and developed modules, an open source software platform and therefore is low cost and useful in terms of modularity. The partial usage of COTS reduces cost as well as the development cycle. The usages of designed modules mitigate the shortfalls of the COTS systems and hence achieves modularity. The avionics framework includes on board integrated sensors, actuator control and software integration. This system may act as a stand alone avionics box that can be used in many different kinds of UAVs over a wide range of sizes, types and mission specifications.

The avionics framework provides at least three operations modes for a UAV. In a first mode, the UAV is controlled manually from a remote station. RF communications are used to send flight commands to directly control the UAV from the ground or other remote location. In a second mode of operation, the UAV is controlled completely by onboard hardware and software. This is referred to as an autonomous or autopilot mode. In a third mode of operation, control is shared between the remote station and the autonomous mode. Manual commands from the remote location are provided as telecommands, which are processed by a flight control system of the framework to determine whether control is done via a flight management system, or through a manual telecommand.

FIG. 1 is a block diagram of an embedded hardware platform 100 that includes modules for the modular avionics framework for a UAV. The embedded or on board hardware 100 mainly consists of three sub systems. They are the avionics system, sensor system and control surfaces. The avionics system includes a control module 105, data acquisition module 110, RF module 115 and power module 120.

In one embodiment, the avionics system or platform 100 consists of four electronic cards corresponding to the above modules, namely a Single Board Computer (SBC) for control module 105, a Data Acquisition Card also known as Input/Output (IO) card corresponding to the data acquisition module 110, a Radio Frequency or communication system card corresponding to RF module 115, and a power card corresponding to power module 120. The SBC in the avionic system is the prime processing board, which is based on an XScale processor (PXA255) from Intel in one embodiment. Many other processors or controllers may be used. The selection of the correct processor and the correct SBC may be done based on the power, efficiency, cost, size and availability and speed of operation. An on board software framework and other software sub modules may be executed in this board. An operating system, such as Linux may run on this board as a basic platform.

The SBC board interfaces with a Data Acquisition card or board as well as sensors. The Data Acquisition card 110 also known as the IO card that performs the functionality of Pulse Width Modulation (PWM) generation, switching between different modes of operations, multiplexing sensor inputs and telemetry/telecommand (TTC) routing. This board may be based on a PIC controller dsPIC30F3014 from Microchip. It also includes other chips for performing the described functionalities. Many different commercial off the shelf electronics, or specifically designed electronics may be used for the boards or modules in various embodiments.

The Communication board or the RF board 115 is used to communicate between the on board system and a Ground Control Station (GCS). It operates at 2.4 GHz frequency in one embodiment, and may be interfaced to the IO card to download information through various protocols, such as a TTC protocol. It also uploads commands from GCS to the on board SBC through IO board. While the term ground control station is used, it is meant to cover any type of remote station, which may or may not be on the ground.

The power board 120 receives DC power from a battery, or other power source such as solar or other radiation, in one embodiment, and feeds the desired power to all sub systems of UAV. Different voltage conversion takes place through a DC-DC converter. Power board also takes care of the power telemetry stating the current power status of all sub systems. In one embodiment, the power module also incorporates the provision of switching ON or switching OFF the power to the sub systems remotely from the ground station.

The sensor system in one embodiment comprises several sensors, such as inertial navigation system (INS) 125, global positioning system (GPS) 130, air data system (ADS) 135, fuel sensor 140, engine temperature sensor 145 and engine speed sensor 150. All these sensors act as input system to the avionics system. Parameters sensed by the described sensors serve as inputs for autonomous software modules such as a vertical/lateral guidance module and flight control system (FCS). The sensor INS 125 measures the attitude i.e., roll, pitch, yaw, acceleration of the UAV. GPS 130 measures position i.e., latitude, longitude and altitude. ADS 135 measures air speed, wind speed and altitude. A sensor system software module integrates all these inputs and feeds them to the desired software modules.

The control surfaces are represented as actuator servos for aileron 155, rudder 160, elevator 165 and throttle 170. The control surfaces of the UAV are the four actuators namely aileron, elevator, rudder and throttle. These control surfaces are mainly responsible for the complete flight of the UAV system. The control surfaces of the UAV are connected to the corresponding four servos attached to the avionics system. The control of these servos is a major function of the on board system architecture. The movement of the servos is regulated by the PWM technique. In this technique desired pulses are generated as a function of the angle given. These generated pulses actuate the servos to move to the desired angle in response to the pulses fed to them. The PWM pulses are generated by the IO card of the avionic system.

Figure 2:
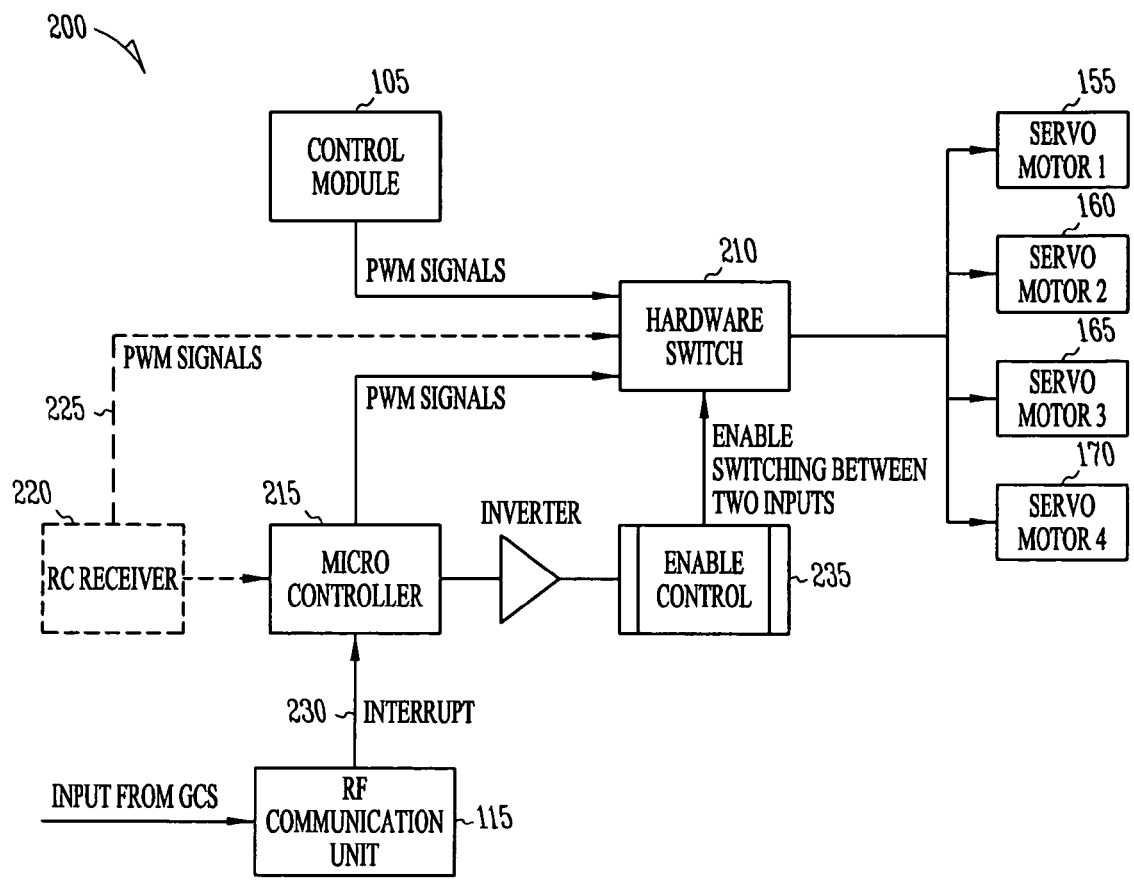
FIG. 2 is a block diagram of a data acquisition module for switching techniques between the autonomous and manual modes of operations of the UAV in the modular avionics framework for an unmanned aerial vehicle (UAV) according to an example embodiment.

The data acquisition module 110 performs three major functions in one embodiment. Switching, as shown in FIG. 2 generally at 200, is one function that performs switching between manual and autonomous modes of operations. The switching is performed by an electronic switch 210 and control commands of the switch are controlled by microcontroller 215 using interrupt commands.

In manual mode, the framework operates between two systems. Either a RC receiver 220 can be used or the RF unit 115 can be used. In case of RC receiver, the switching between manual and automatic mode is achieved by using the pulses 225 generated by the RC receiver 220 in the $5^{th}$ channel. The $5^{th}$ channel pulse is interpreted by the microcontroller 215 and the control unit is tuned to enable the switch 210 for manual mode. In this case, the PWM signal 225 is generated by the RC receiver. In case of RF unit 115, the switching signal is given to the microcontroller through RF unit as an interrupt signal on line 230. At the similar fashion, the microcontroller enables an enable control 235 for different modes.

The concept of switching between the modes of autonomous and manual control is implemented using a novel switching technique. This technique enables a modular system to be operated with multiple configurations. Multiple configurations are the use of RC, use of RF or other wireless communication unit. In all cases, different switching commands are sent from the ground station, and the on board design takes care of interpretation and performs PWM generation accordingly.

Figure 3:
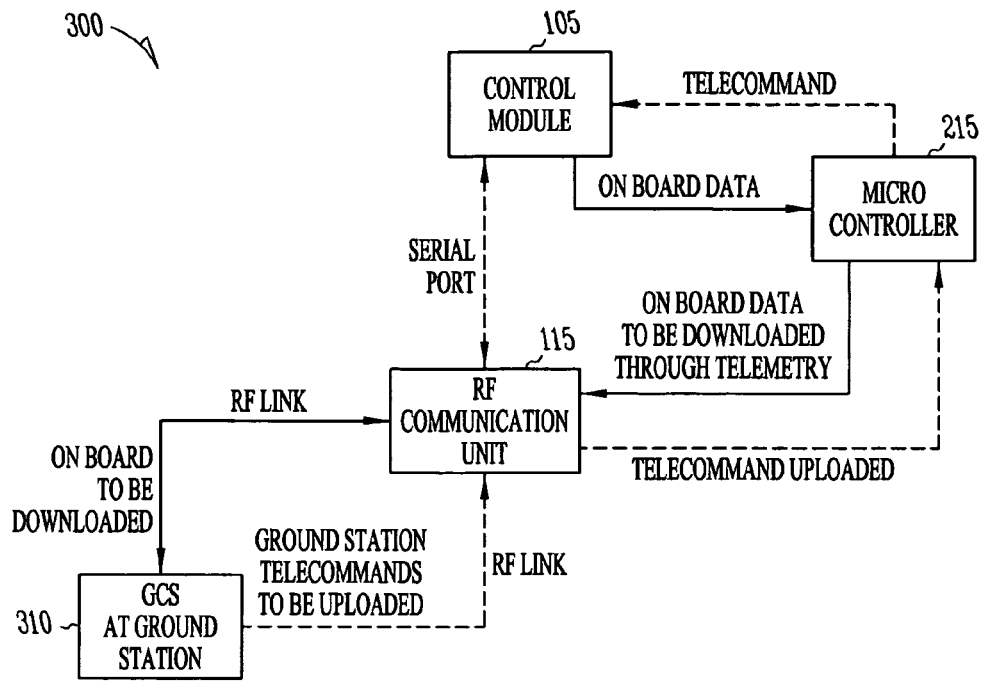
FIG. 3 is a block diagram of a data acquisition module functionality of execution of telemetry and telecommand communication protocol for the modular avionics framework for an unmanned aerial vehicle (UAV) according to an example embodiment.

The data acquisition module 110 function also includes telemetry and telecommand functions as illustrated in FIG. 3 generally at 300. All on board information is downloaded to a ground station 310 through telemetry whereas the commands from the ground station are uploaded to the on board system through telecommand operation. Both the telemetry and telecommand functions are performed through the RF module 115. Communication between the ground station and on board system is done by using the RF module, whether directly connecting the RF to SBC or through routing the RF data through the data acquisition module 110. Routing through data acquisition module is helpful for remote piloting commands. The telemetry and telecommand are shown with different types of lines in FIG. 3. The classification and prioritizing of the data may be used to download large amount of onboard information within a limited bandwidth in real time. Telecommand handshaking may be used to ensure the successful receive of ground commands.

Figure 4:
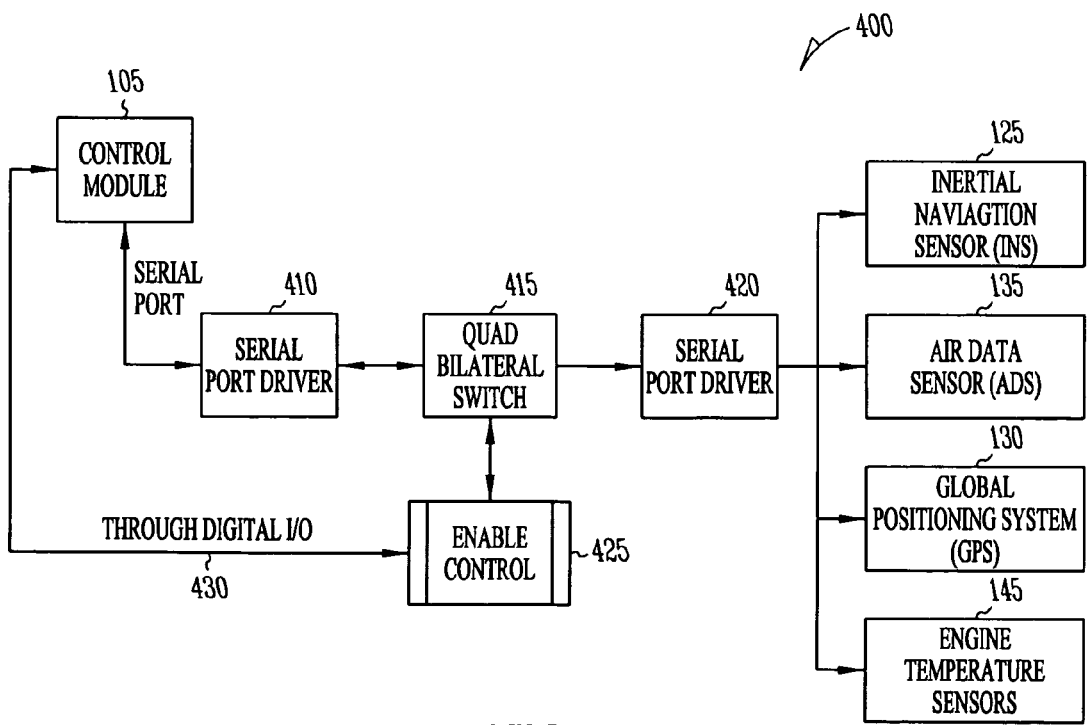
FIG. 4 is a block diagram of a provision of multiple sensors integration to the control module through the data acquisition module for sensor input functions for the modular avionics framework for an unmanned aerial vehicle (UAV) according to an example embodiment.

The third function of the data acquisition module 110 is provision of multiple sensor connectivity as illustrated in FIG. 4 generally at 400. This may be achieved through a multiple serial port approach as all the sensors considered are interfaced through a serial port via serial port drivers 410. A quad switch 415 is used to select a serial port 420 in one embodiment, allowing a single serial port to operate with four serial devices. Input/output controls 425 of the electronics quad switch 415 are controlled through a digital 10 interface 430 of the control module 105. The appropriate software distinguishes the sensor data. Handling the provision of integrating multiple sensors through the use of hardware and minimum software leverages the system from loading and assures reliability.

In manual mode of operation, the UAV can be controlled from the Ground Control System (GCS) manually through RF sub system or through Radio Control (RC).

In autonomous mode, the Vertical/Lateral guidance algorithm and FCS generate control command for the actuators automatically based on the sensor inputs and predefined flight planning.

Shared mode of operation is a combination of manual and autonomous modes. In the shared mode, the UAV flies autonomously and also can be controlled manually whenever required.

In the autonomous mode of operation, the switch along with controller connects the UAV control surfaces to the SBC, whereas, in case of manual control the switch is connected to the microcontroller PWM output. The manual operation may be through Radio Control (RC) or can be through remote piloting from ground station using RF unit. In both cases the design enables the onboard data acquisition system respond to the same command and executes switching control. The switching methodology of using microcontroller based switching ensures a generic approach of addressing different inputs (RC, RF, SBC) as a single solution without demanding much change in hardware or software.

Through these three modes of operations all UAV applications may be achieved. During flight UAV information such as attitude, position, speed and health of sub systems may be observed at the Ground Control Station (GCS) through the telemetry and telecommand (TTC) system. This TTC system along with the RF system is known as the communication system of the UAV. Therefore the on board avionics framework is divided into the following major systems and sub systems and their integration.

In this refereed framework in one embodiment, the computing platform used is a COTS based Single Board Computer (SBC). The major Critical to Quality (CTQs) of the selection of The SBC are processing power, speed, power consumption, size and weight. Taking into consideration all the CTQs, in one embodiment, an XScale (Intel PXA 255) based SBC meets the desired requirement of power consumption as low as 0.5 watts and high speed of operation. The XScale processor operates at 400 MHz and consumes low power of 0.5 W. The SBC board considered is PCM7220, Advantech make because of its maximum peripheral support, low cost and compact size.

In one embodiment, the PCM 7220 XScale based SBC comprises of Intel XScale PXA255 processor, 32 Mbytes Flash memory, 64 MByte SDRAM and peripherals such as 4 COM ports, USB, Audio, Ethernet, PCMCIA slot for storage etc. The board is very small in size and fulfills all the requirement of the autonomous flight of the UAV.

Major functions of the data acquisition system involve generation of Pulse Width Modulated (PWM) pulses for servo control, interfacing number of sensors, decode and interpret telecommand signal, interface to RF system, switching between manual and autonomous mode of operation and finally routing of telemetry information from SBC to the GCS.

In one embodiment, the data acquisition system comprises a DSP based microcontroller (dsPIC30F6011) from Microchip. The four channels in built PWM controller generate PWM outputs based on the input from FMS plus FCS software module in autonomous mode of operation. The same PWM pulses also are generated based on the angular input from the GCS, which enables manual and shared modes of operations. The PWM pulses are feed to four servos connected to the corresponding actuators rudder, aileron, elevator and throttle. One of the other functionalities of data acquisition system includes conversion of one serial interface to multiple serial interfaces. The multiple serial interfaces give connections to a number of sensors. This system interface SBC as well as RF system through serial port only. The telemetry and telecommand information between on board and GCS is routed through this system. This system also includes switches that provide the PWM control and hence the actuator control either to SBC or to GCS. A Radio Control (RC) system can also replace the GCS system in the manual mode of operation. The switch operates to change different mode of operations mentioned above. Extra serial interfaces such as CAN and I$^2$C may be provided for future applications.

The RF system of the board avionics system is the medium between on board and ground or remote communications. Through the RF system flight information is downloaded to GCS and also flight control commands are uploaded from GCS to on board system.

Major functions of the RF system are to transmit and receive the RF signal, amplify to desired level, modulate/demodulate it to base band signal, convert the base band signal to digital signal and finally communicate the digital signal to other sub systems. Therefore RF system comprises an antenna, RF transceiver, modulator/demodulator and Analog to digital converter/Digital to analog converter (ADC/DAC).

Selection of the right RF frequency band may be done as a function of a link analysis and simulation. A RF frequency band of 2.4 GHz may be used. The selection may be a function of two criteria. One of the criteria is to match the link analysis for a range of 5 km maximum line of sight, $10^{-3}$ BER, available transceiver sensitivity (−95 to −105 dBm). The other criteria are that 2.4 GHz falls under ISM band which is a license free band for any application. The criteria may change over time, and may result in the selection of different frequencies for various alternative embodiments. In one embodiment, a COTS RF system selected may be Maxstream's Xstream OEM RF module because of the following features, indoor range—180 m, out door range—5 km, RF data rate—20 Kbps, output power—50 mW, receiver sensitivity—102 dBm, small size and less weight (24 g), and a RS-232 Interface. The COTS RF unit may be interfaced to IO system through a serial port. The SBC TTC information may be routed to the RF system through IO card only.

The avionics has a low weight, compact in size, highly reliable, telemetry and tele-command based integrated UAV On-board Power System. This power system may obtain power from a main and an auxiliary battery, which takes care of battery failure. In one embodiment, the UAV On-board power system powers the entire UAV system and sub-systems. This power system is low in weight, compact in size and highly reliable for UAV operations to meet better mission endurance capability. It has capacity of powering up to 20 W power to meet all sub-systems nominal and transient load current demand efficiently. The low weight, compact, highly reliable, integrated UAV On-board Power System which provides additional features, such as an auto battery change over circuit for longer mission endurance, telemetry of entire Power System, UAV Sub-systems can be remotely made ON/OFF through Tele-command through Ground Control System (GCS) for efficient Power Management, and reverse polarity protection, short circuit protection and input under voltage lock out protection to avoid fully discharge of the battery.

In one embodiment, the power card receives +12 V signal from a Li Polymer battery. The DC-DC converter, delivers 5V, 20 W output power. The power for all the sub systems, sensor, and servos are supplied through desired protection circuitry. Battery life and voltage levels are telemeter to GCS through RF system for remote pilot information. A number of diodes and relays are considered for protection circuitry.

The power system also has the capability of switching ON or OFF the power for the on board sub systems of the UAV avionics framework. From the downloaded data through telemetry, if it is observed that a sub system is not functioning due to some reason, the pilot at the remote ground control station can send a command to switch off the particular sub system without affecting the core functionalities. Similarly, if a sub system draws more current and hence battery health status becomes a challenge, such sub systems can be power shut down for optimal utilization of battery power. The UAV can operate without a few sub systems. Although these are worst case scenarios, still gives a proactive action for safety and anticipated criticality.

The power module captures the health status of each battery, current drawn by each sub system and DC-DC converter. The system then provides the captured information to the data acquisition module to form a packet and send it to ground. The update of power information at the ground station saves the on board system from damage as well as helps the remote pilot make decisions regarding whether to continue flight or bring the UAV back. Alerts may be added to the system to utilize the existing power optimally. These features may serve to make the system safe, efficient and modular.

The computing platform that executes on board software modules in the SBC is a Real Time Operating System (RTOS) that is ported to the SBC processor. In the one example avionics framework, Linux: an open source RTOS may be used as the computing platform.

Figure 5:
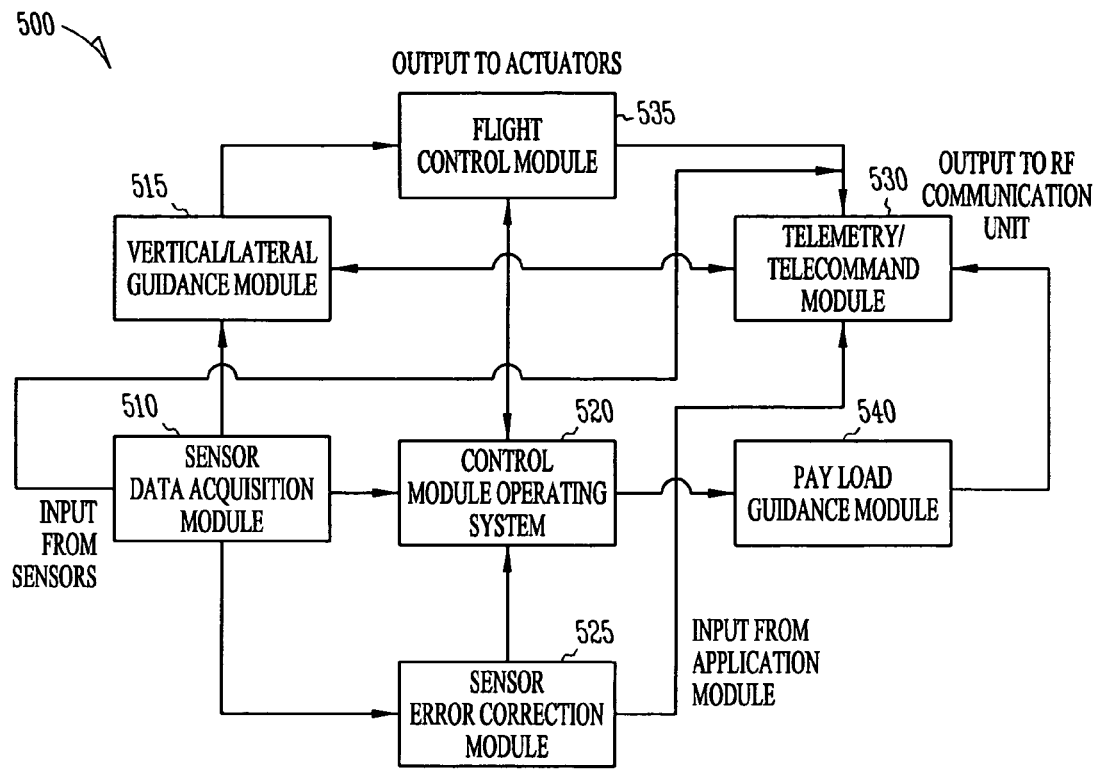
FIG. 5 is a software architecture diagram of a modular avionics framework for an unmanned aerial vehicle (UAV) according to an example embodiment.

The on board software architecture 500 is shown in FIG. 5. FIG. 5 depicts top-level interactions among the software components/modules. The on board software system also known as the integrated avionics software system is designed as software layers, each performing predefined task. The layered design approach increases the modularity and scalability of the software system. An application layer is the top most layer in the software system. It utilizes services of all the layers below to perform pre-defined functions. In the integrated avionics system, the application layer performs sensor data acquisition, control, guidance, navigation, telecommand and telemetry, payload control etc.

In FIG. 5, data from sensors is received at sensor data and acquisition module 510, which in turn provides data to several other modules, including vertical/lateral guidance module 515, control module/operating system 520, sensor error correction module 525, and telemetry/telecommand module 530. A flight control module 535 provides output to actuators, and a payload module 540 receives input from application modules, such as cameras or other sensors carried by the UAV.

Figure 6:
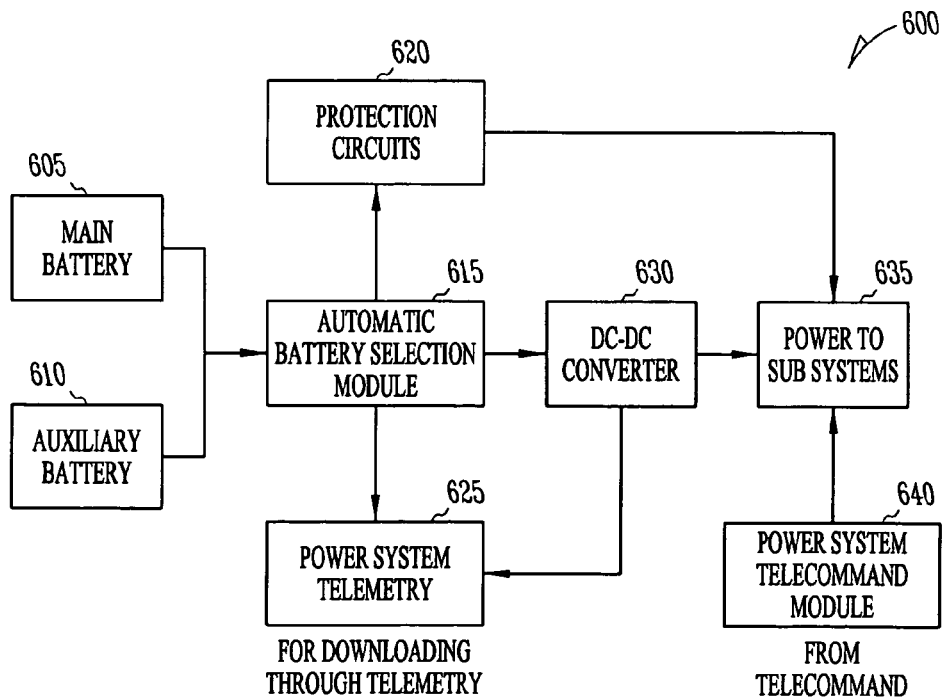
FIG. 6 is the block diagram capturing the major functionalities of the power module for the modular avionics framework for an unmanned aerial vehicle (UAV) according to an example embodiment.

A hardware architecture 600 is shown in FIG. 6. A main battery 605 and auxiliary battery 610 may be used to provide power to the hardware 600. An automatic battery selection module 615 is used to select a desired battery or batteries. Protections circuits 620 may be used to protect hardware systems and sub systems. A power system telemetry module 625 may be used for downloading information through telemetry. A DC-DC converter 630 provides desired DC power levels to a block 635 that distributes power to various sub systems. A power system telecommand module 640 receives telecommands regarding power use and distribution.

In case of TTC, the information to be sent is enclosed in a packet. For example, the telemetry information may be categorized as sensor packet, FMS packet, health packet etc. The packets are then assembled in the data field of a frame and finally the on board system sends the information in the form of frames in one embodiment. In case of telecommand, the same thing applies to send the desired commands. Therefore, care should be taken to define the packet header, header fields, frame header, length of packet and length of frame.

A telemetry packet and frame format can be viewed as follows: Packet header definition, Packet categorization, Packet length calculations, Frame header definition, and Frame length Calculation.

In one embodiment, a telemetry packet is a defined format that contains two major blocks. One block is a packet header and the other is a packet data field. The packet header is again divided into two sub groups named as packet identification and packet control. The fields inside the packet header are defined as follows. Packet identification—Version number—3 Bits—This is the version of the telemetry packet. Type—1 bit—This defines about TC or TM packet. If "1" its TC packet of "0", its TM packet. Packet ID—4 Bits—This mentions about the type of the packet. It is defined clearly in this field the type of packet like sensor, FMS, FCS, payload and health packets. Being 4 bits field, it can define up to 16 types of packet.

Figure 7:
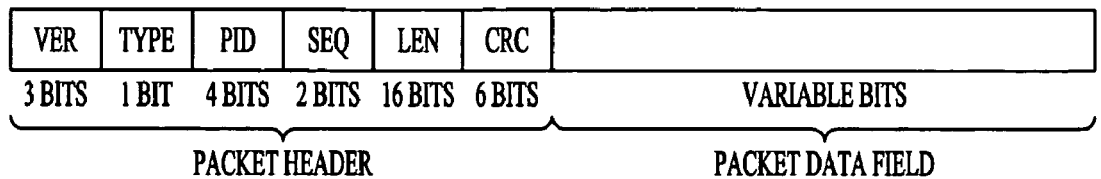
FIG. 7 illustrates the contents of a telemetry packet for a modular avionics framework for an unmanned aerial vehicle (UAV) according to an example embodiment.

Packet control—Packet sequencing—2 bits—The sequencing of the above mentioned packets inside a frame is also important. It can be dynamically changed as per demand. Therefore, this field can define 4 different types of sequencing of packets in a frame. Packet Length—16 bits—It can define the length of the packet. Maximum packet length allowed is 64 Kbytes. CRC—6 bits—These bits have been allocated for error correction and coding. A packet is illustrated at 700 in FIG. 7. The packet header is fixed which is of size 4 bytes and the data field which contains the information to be sent is of variable bytes. The total length of the TTC packet cannot exceed 64 Kbytes.

Packet categorization may be done for the telemetry system in order to extract the onboard information in an organized manner as well as extract easily and quickly. After analyzing UAV information that is sent from onboard system to ground station, the packets are categorized under four headings: sensor packets, Lateral/vertical guidance packets, FCS packets, health Packets, and payload packets. Each of these packets contains information about the UAV and sends them under the above packet headings. As header size of each packet is fixed and defined to be of 4 bytes, the total length of the packet depends on the number of parameters it contains and their size. Each packet type may differ in size.

The frame header as defined in one embodiment, contains few fields of variable lengths. These fields define the type of frame and its functional details. Each frame is preceded by a 32 bit synchronization code. The frame header definition is as follows: Synchronization flag—1 bit, Packet header flag—1 bit, Number of packets=3 bits—can mention about 8 different packets that can be accommodated inside a frame. If required this field can be extended to more number of bits, Frame length—16 bits—maximum length of the frame that includes the length of all the packets accommodated in the data field of the frame and the frame header, Extra—3 bits.

Figure 8:
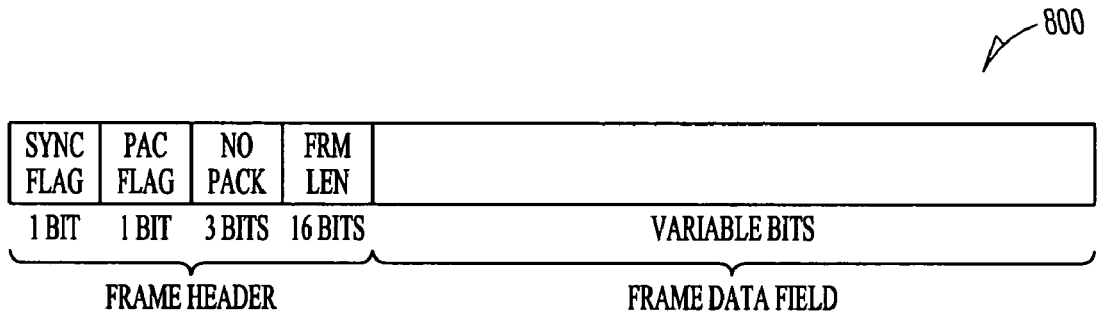
FIG. 8 illustrates the contents of a communication frame for a modular avionics framework for an unmanned aerial vehicle (UAV) according to an example embodiment.

The total size of the header is of 4 bytes. The rest of the frame is the data field, which is variable. The data field contains the packets. An example frame is shown in FIG. 8 at 800. The frame header is fixed 4 bytes and the data field is variable, which depend upon the length of the packets accommodated inside a frame.

The total frame length depends on the header as well as the packet lengths it accommodates in its data field. So rough calculation of the total frame length is as follows: Total frame length=32 bits header+sensor packet 99 bytes+FMS packet 89 bytes+health packet 28 bytes=220 Bytes. The calculated frame length is around 220 Bytes. The maximum frame length can be (64*3) K+4 bytes that is 196 Kbytes.

The telecommand packet format can be viewed as follows, packet header definition, packet categorization, packet length calculations. A telecommand packet is a defined format that contains two major blocks. One is a packet header and the other is a packet data field. The packet header is again divided into two sub groups named as packet identification and packet control. The fields inside the packet header are defined as follows: Packet identification—Version number—3 Bits—This is the version of the telecommand packet, Type—1 bit—This defines about TC or Ack packet. If "1" its TC packet of "0", its ACK packet, Packet ID—4 Bits—This mentions about the type of the packet. It is defined clearly in this field the type of control packet like servo control packet, payload and sensor control packets. Being 4 bits field, it can define up to 16 types of packet.

Figure 9:
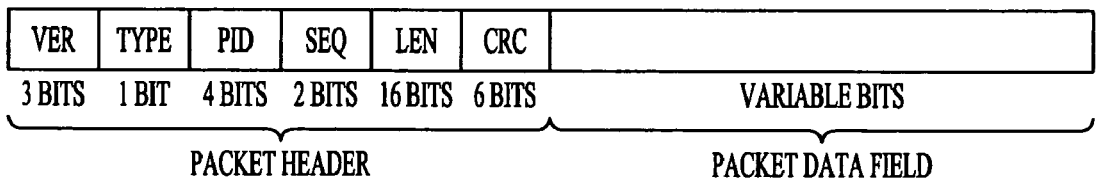
FIG. 9 illustrates the contents of a telecommand packet for a modular avionics framework for an unmanned aerial vehicle (UAV) according to an example embodiment.

Packet control—packet sequencing—2 bits—The sequencing of the above mentioned packets inside a frame is also important. It can be dynamically changed as per demand. Therefore, this field can define 4 different types of sequencing of packets in a frame, packet length—16 bits—It can define the length of the packet. Maximum packet length allowed is 64 Kbytes, CRC—6 bits—These bits have been allocated for error correction and coding. An example packet is shown in FIG. 9 at 900. The packet header is fixed which is of size 4 bytes and the data field which contains the information to be sent is of variable bytes. The total length of the TTC packet cannot exceed 64 Kbytes.

The packet categorization is done for the telecommand system in order to extract the ground pilot control information in an organized manner as well as extract easily and quickly. After analyzing control information that is sent from ground station to onboard system, the packets are categorized under 3 headings: payload control packets, sensor control packets and servo control packets. Each of these packets contains information about the control data and sends them under the above packet headings.

As header size of each packet is fixed and defined to be of 4 bytes, the total length of the packet depends on the number of parameters it contains and their size. Each packet type that way will differ in size and its length may be calculated.

The avionics framework is a modular avionics system is useful for many applications of UAV systems. It enables small UAVs to fly autonomously with the ability to integrate camera, Infra Red (IR) sensor and cloud seeding like agents to achieve mission specific operations. The COTS based framework not only assures higher efficiency of performance but also reduces total cost of UAV by reducing the development cycle. The referred system is modular enough to fit in any UAV weight ranges vary from 12 Kg to 50 Kg MTOW. It also is capable of integrating versatile payloads for different applications.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A modular avionics system for an unmanned aerial vehicle (UAV), the system comprising:
    a control module that executes flight control and vertical and lateral guidance functions to generate control commands;
    a data link module communicating with a remote control station and receiving control commands from the remote control station;
    a data acquisition module communicating with the control module and the data link module wherein the data acquisition module is adapted to receive and process data from one or more onboard sensors and further actuate a plurality of servo motors in response to control commands; and
    a switching module adapted to selectively couple the data acquisition module to the control module or to the data link module responsive to an input from the remote control station to facilitate switching between modes of operation of the UAV;
    wherein the control module comprises a telemetry/telecommand module with a communication protocol that includes classification of the telemetry data, prioritizing the classified data, customizing header format for the telemetry and telecommand packets, and a handshaking methodology for telecommand; and
    wherein the switching module includes an electronic switch controlled by a microcontroller, wherein the switch enables the microcontroller to process manual telecommands from a remote station, and wherein the microcontroller implements a shared mode of operation by determining whether control is performed by a flight management system or through the manual telecommand.

2. The system of claim 1, wherein the mode of operation includes at least one of a manual mode or of an autonomous mode.

3. The system of claim 1 and further comprising means for powering such modules.

4. The system of claim 1 wherein the control module comprises a software architecture for autonomous flight of UAV, which further includes a sensor data acquisition module, an error correction module for sensor accuracy, a vertical/lateral guidance module, a flight control module, a telemetry and telecommand module, and a payload module.

5. The system of claim 1, and wherein the data acquisition module comprises a switching module that includes an electronic switch controlled by a microcontroller, wherein the switch enables the on board system to switch between an autonomous mode of control and more than one type of manual control.

6. The system of claim 5 wherein the types of manual control include RC control or remote piloting using RF.

7. The system of claim 1 wherein the data acquisition module integrates multiple sensors to the system by using hardware drivers and bilateral switches.

8. The system of claim 1 and further comprising a power module that selectively provides powering ON or powering OFF the on board sub systems remotely from ground station using telecommand.

9. The system of claim 8 and further comprising a power module that transmits power health status signals to the ground control station.

10. The system of claim 1 and further comprising a power module that provides over current protection features.

11. A modular avionics framework of an unmanned aerial vehicle (UAV), the framework comprising:
- a control module adapted to execute flight control and flight management algorithms residing therein;
- a data link module configured for communication between said avionics framework and a remote control station;
- a data acquisition module in communication with the control module and the data link module, the data acquisition module being configured to receive and process data from one or more onboard sensors and to actuate a plurality of servo motors in response to a control command from the control module or from the remote control station via the data link module;
- a switching module configured to selectively couple the data acquisition module to the control module or to the data link module, responsive to an input from the remote control station, wherein coupling the data acquisition module to the control module facilitates a fully autonomous mode of UAV operation and coupling the data acquisition module to the data link module facilitates a manual mode of UAV operation; and
- a power module configured to generate and distribute power to the data link module, data acquisition module and the control module and to transmit a signal indicative of power health to the ground control station;
- wherein the control module comprises a telemetry/telecommand module with a communication protocol that includes classification of the telemetry data, prioritizing the classified data, customizing header format for the telemetry and telecommand packets, and a handshaking methodology for telecommand; and
- wherein the switching module includes an electronic switch controlled by a microcontroller, wherein the switch enables the microcontroller to process manual telecommands from a remote station, and wherein the microcontroller implements a shared mode of operation by determining whether control is performed by a flight management system or through the manual telecommand.

12. The modular avionics framework of claim 11 wherein the control module comprises an SBC.

13. The modular avionics framework of claim 11 wherein the control command from the remote control station comprises a telecommand.

14. The modular avionics framework of claim 11 wherein the control module comprises a software architecture for autonomous flight of UAV, which further includes a sensor data acquisition module, an error correction module for sensor accuracy, a vertical/lateral guidance module, a flight control module, a telemetry and telecommand module, and a payload module.

15. The modular avionics framework of claim 11 wherein the data acquisition module comprises a switching module that includes an electronic switch controlled by a microcontroller, wherein the switch enables the on board system to switch between an autonomous mode of control and more than one type of manual control.

16. The modular avionics framework of claim 15 wherein the types of manual control include RC control or remote piloting using RF.

17. The system of claim 11 wherein the power module selectively provides powering ON or powering OFF the on board sub systems remotely from ground station using telecommands, transmits power health status signals to the ground control station, and provides over current protection features.

18. A modular avionics system for an unmanned aerial vehicle (UAV), the system comprising:
- means for executing flight control and vertical and lateral guidance algorithms to generate control commands;
- means for communicating with a remote control station and receiving control commands from the remote control station;
- means for communicating with the means for executing and the means for communicating with a remote control station, and for receiving and processing data from one or more onboard sensors and actuating a plurality of servo motors in response to control commands; and
- means for switching to selectively couple the means for communicating to the control module or to the data link module responsive to an input from the remote control station to respectively switch between a fully autonomous mode of UAV operation and a manual mode of UAV operation;
- wherein the means for executing flight control and vertical and lateral guidance algorithms to generate control commands comprises a telemetry/telecommand module with a communication protocol that includes classification of the telemetry data, prioritizing the classified data, customizing header format for the telemetry and telecommand packets, and a handshaking methodology for telecommand
- wherein the means for switching includes an electronic switch controlled by a microcontroller, wherein the switch enables the microcontroller to process manual telecommands from a remote station, and wherein the microcontroller implements a shared mode of operation by the microcontroller determining whether control is performed by a flight management system or through the manual telecommand.

19. The system of claim 18 and further comprising a power module that selectively provides powering ON or powering OFF portions of the means elements from ground station using telecommands, transmits power health status signals to the ground control station, and provides over current protection features.

* * * * *